United States Patent [19]

Hotier et al.

[11] Patent Number: 5,093,004
[45] Date of Patent: Mar. 3, 1992

[54] CONTINUOUS PROCESS AND APPARATUS FOR CHROMATOGRAPHIC SEPARATION OF A MIXTURE OF AT LEAST THREE CONSTITUENTS INTO THREE PURIFIED EFFLUENTS USING TWO SOLVENTS

[75] Inventors: Gérard Hotier, Rueil Malmaison; Jean-Michel Toussaint, Asnieres; Gabriel Terneuil, Grenoble; Daniel Lonchamp, La Demi Lune, all of France

[73] Assignee: Institut Francais du Petrole, Rueil Malmaison, France

[21] Appl. No.: 573,582

[22] Filed: Aug. 28, 1990

[30] Foreign Application Priority Data

Aug. 28, 1989 [FR] France .............................. 89 11364

[51] Int. Cl.$^5$ ............................................ B01D 15/08
[52] U.S. Cl. .................... 210/659; 210/198.2; 127/46.1; 127/46.2
[58] Field of Search ............... 210/635, 656, 659, 672, 210/198.2; 208/310 R; 127/46.2, 46.1

[56] References Cited

U.S. PATENT DOCUMENTS

| | | | |
|---|---|---|---|
| 2,985,589 | 5/1961 | Broughton et al. | 210/34 |
| 3,696,107 | 10/1972 | Neuzil | 208/310 |
| 3,706,812 | 12/1972 | Derosset et al. | 260/674 SA |
| 3,761,533 | 9/1973 | Otani et al. | 208/310 |
| 4,029,717 | 6/1977 | Healy et al. | 208/310 |
| 4,031,156 | 6/1977 | Geissler et al. | 210/672 |
| 4,306,107 | 12/1981 | Broughton | 585/828 |
| 4,379,751 | 4/1983 | Yoritomi | 210/659 |
| 4,402,832 | 9/1983 | Gerhold | 210/659 |
| 4,498,991 | 2/1985 | Oroskar | 210/659 |
| 4,724,081 | 2/1988 | Kawahara | 210/198.2 |
| 4,970,002 | 11/1990 | Ando | 210/659 |
| 4,990,259 | 2/1991 | Kearney | 210/659 |

Primary Examiner—Ernest G. Therkorn
Attorney, Agent, or Firm—Millen, White & Zelano

[57] ABSTRACT

A description is given of a process and an apparatus for continuous separation in fluid phase of a mixture of at least three constituents into three fractions. A technique is used, known as the simulated countercurrent technique, in a separation column which is filled with sorbent and has 6 zones 6, 5, 4, 3, 2 and 1 which have different functions, and the following sequence of steps is carried out: strong solvent $S_2$ is introduced, an extract $E_2$ with strong solvent is removed, weak solvent $S_1$ is introduced. The extract with weak solvent $E_1$ is drawn off, the separating mixture is introduced, refined substance is drawn off with weak solvent R, rinsing solvent ($S_1$) is introduced, a current Rcy is recycled alternatingly towards the feed of strong solvent $S_2$ and then towards the feed of weak solvent $S_1$. A current coming from zone 6 is sent alternatingly to an outlet for the extract with strong solvent $E_2$, then towards the intake of the fifth zone. The various feeds and substances removed are periodically advanced synchronously through the column. Application in particular for the separation of glucose, xylose and arabinose and for the separation of paraxylene, orthoxylene and metaxylene and ethyl benzene.

7 Claims, 6 Drawing Sheets

CONTINUOUS PROCESS AND APPARATUS FOR CHROMATOGRAPHIC SEPARATION OF A MIXTURE OF AT LEAST THREE CONSTITUENTS INTO THREE PURIFIED EFFLUENTS USING TWO SOLVENTS

The present invention concerns a process and an apparatus for the continuous separation in fluid phase (liquid, vapour or supercritical) of three or more components of a fluid mixture (liquid, vapour or supercritical) using solid particles or a semi-solid permeable gel which are capable of selectively adsorbing at least two components of the mixture, one of which is adsorbed to a very great extent, so that a simple elution operation is prescribed only a very little for desorption of that component. More particularly, the invention concerns 1) application of the technique known as the "simulated countercurrent" technique to separation operations hitherto carried out by preparative chromatography with an elution gradient, as encountered, for example, in pharmaceutical chemistry, pure chemistry or biochemistry. The invention also concerns 2) traditional application domains of the process for continuous separation in liquid phase employing the simulated countercurrent system on condition that the charges include at least three constituents, for example in the case of the aromatic cut $C_8$, it can be interesting to separate paraxylene and ethyl benzene and an ortho- and metaxylene mixture in one single continuous operation. Another example is the Xylose Arabinose Glucose mixture 3) domains of application, still embryonic, of preparative supercritical chromatography, such as the production of aromas and essential oils.

More generally, this technique is used when at least three products are involved which cannot be separated by distillation, either because their boiling points are too close or because they are thermally unstable.

Most apparatuses for the adsorption of large tonnages consist of a solid adsorbent, and the apparatuses which are used, for example, for drying gases, adsorbing an organic substance, separating n-paraffins in gaseous phase or for producing hydrogen by jerks of pressure are used in accordance with the technique involving the use of a plurality of adsorption beds consisting of solid adsorbing particles for effecting adsorption, desorption and regeneration operations in gaseous phase. However, it is more difficult to use this technique in liquid phase because even during the sorption phase, a considerable fraction of the charge which has not been adsorbed remains in the interparticular space of the sorption phase and in the Macroporosity of the particles. Under these conditions, it is very difficult to obtain a good yield of the desired product with good properties of purity as well, and at profitable costs.

In order to combat this problem, it is possible either to undertake to increase the number of reactors for cleansing to take place which are then recycled by sweeping operations by another compound which, in theory, is not adsorbable or is slightly adsorbable. This clearly gives rise to the problem whereby the procedure is complicated, and cost of the subsequent distillation operation increased. It will therefore easily be appreciated that a sequential desorption sorption process where the liquid feed mixture has either a low separation factor or a body which is very forcibly retained by the adsorbent, cannot result in high concentrations of effluents with good properties of purity.

If the intention is to separate only two separate effluents, the processes based on "simulated countercurrent" as described in U.S. Pat. Nos. 2,985,589, 3,696,107 3,706,812, 3,761,533 or in French Patent 2103302 are effective since they permit continuous production of effluents which have good properties of purety and which are in concentrated solution in the desorbent. U.S. Pat. No. 4,306,107 describes a process for the continuous separation of a mixture having four constituents: meta-xylene, orthoxylene, paraxylene and ethyl benzene using the simulated countercurrent technique with a solvent, toluene. Three fractions are obtained: the first containing pure metaxylene 100% recovered, the third containing pure ethyl benzene only 60% recovered, and the second consisting of a mixture of para- and ortho-xylene, 100% recovered, but also some ethylbenzene accounting for 40% of the initial amount. This process thus has the drawback of partial recovery of the least adsorbed product and of recovery of a mixture at the level of the intermediate fraction.

In the case of small tonnage adsorption apparatuses with which a number of kilos of high added value products are manufactured at the same time, the problem is generally very different from that mentioned hereinbefore. Quite often it happens that one pure product in particular, which is not very concentrated, is trying to be isolated within a mixture of at least a dozen pure bodies, products for example, during the last stage of a synthesis operation. The methods of production tend to be discontinuous, and the cost of separating the solvent from the purified product does not particularly interfere with the lost of the final yield. The separation technique used thus essentially relates to separating the product sought, with, first and foremost, a good yield and secondly with good properties of purity, the appearance of concentration in the separation solvent(s) being taken into consideration either not at all, or only a very little. Although the technique with the elution gradient is complex, it is often used in practice. It involves sending a complex charge onto the column, then in effective an elution operation by using a first solvent which, since it only has a slight affinity with the fixed phase, perceptibly displaces only those bodies which are only slightly retained by the adsorber. As the operation proceeds, the first solvent is gradually replaced by a second one which has a very great affinity with the adsorbent and which thus displaces almost all the bodies contained in the charge as if they were not being retained by the adsorbent at all. Thus, the progressive, continuous variation in the solvent power and the affinity of the eluent in the column produces gradual elution of the various products of the charge. The product sought will therefore be collected in the form of a specific fraction of the eluted current. The subsequent phase involves reconditioning the column with the first of the two solvents. In addition, the column must be regenerated periodically because the fixed phases used are often sensitive to poisoning by traces of certain bodies contained in the charge, or one or other of the two solvents. The elution gradient technique is capable of operating on several physical principles used in liquid chromatography. The following may, in particular, be cited:

1) Chromatography by permeation of gel which operates on the exclusion principle: the large molecules incapable of entering the cavities of the gel are eluted first, whereas the smaller ones which travel through all the cavities available are eluted last. The elution gradient can modify the phenomena in two ways:

a) by acting upon the molecules of the charge: by way of solvation which becomes progressively more intense. Molecules with a gyratory radius, identical initially, of the "statistical" ball-kind configuration solvate and are used in different ways depending on their function;

b) by acting on the fixed phase: by way of a gradual swelling of the gel; the size of the cavities is gradually restricted by retaining only those molecules which are smaller and smaller in size.

2) Chromatography in inverse phase which acts upon the division coefficient of solutions between an aqueous phase and an organic phase. One known example assists in the separation of a slightly soluble mixture of organic products only slightly soluble in water on a $C_{18}$ grafted silica by using a water-methanol gradient. As the concentration of methanol in the mobile phase increases, the products which are more liposoluble gradually become detached from the fixed phase.

3) Affinity chromatography which operates either on Van der Waals type bonds or on "hydrogen" bonds between solution and fixed phase. When an apolar hydrocarbon solvent is replaced by a methylene chloride or chloroform type polar solvent, it is possible to elute solutions which are of progressively greater polarity.

The elution gradient technique does not have to involve using two different solvents. It is possible to operated with a pH gradient where two solvents are replaced by two plugged solutions. It is also possible to operate with pressure gradient (one single supercritical solvent) with the remainder of a "hold-back" substance, generally in the form of traces (up to 3%).

The variety of fixed phases and couples of solvents is such that the majority of separations reputed as being impossible 25 years ago are possible nowadays. By way of example, the resolution of enantiomers or racemic mixtures can be quoted (with optically active fixed phases) "Preparative separation of enantiomers on axially compressed column" K. H. Rimboeck, F. Kastner, A. Mannschreck, Journal of Chromatography No. 329(1985) p. 307-310.

These methods have the disadvantage of not being continuous despite the fact that they are able to be automated, Ref. J. Krohm, F. Verillon (international laboratory October 1986). They are designed in order to produce, at the best, a few dozen kilograms per annum, with a very flexible and versatile apparatus capable of serving a number of different separation operations as required.

The state of the art is also described in U.S. Pat. No. 4,498,991. According to that document, it is possible to obtain two fractions from one mixture containing three or more compounds so that, in order to be able to separate multi-constituents, one separating unit has to be used per constituent, which is particularly expensive in terms of investment and solvents used. According to another patent FR 2,274,331, it is also possible to carry out separation of a mixture which results in one single effluent with good properties or purity, by introducing two currents of solvents of different strength into a simulated countercurrent apparatus.

The state of the art is also illustrated in the patent No. EP-A-0.290.684 and U.S. Pat. No. 3,728,843.

The aim of the present invention is to provide a solution to the afore-mentioned drawbacks. In particular, one of the aims of the invention is to obtain from a mixture of at least three constituents three fractions (each of which contains at least one constituent, the constituent(s) of each fraction being more or less recovered 100%).

A further aim is to obtain an intermediate fraction between the top fraction and bottom fraction which can contain a mixture of products which have been recovered more or less 100%. Another aim is to obtain an intermediate fraction which can only contain one single constituent, more or less pure and recovered more or less 100%.

Another aim is to improve integration of the purging phases into the cyclic processes, by producing or recycling an intermediate fraction in the treatment.

In summary, the aim of the invention is the continuous separation, into three separate effluents, with a high degree of purity and with increased concentration, of a charge constituted of one mixture having at least three products, wherein there is:
1) greater efficiency and greater simplicity than with the simple association in series of two traditional simulated countercurrent units
2) very reduced consumption of the solvent and a lower quantity of fixed phase than with isocratic discontinuous separation or elution gradient separation.

In other words, the aim of the invention is to unite the simulated countercurrent gradient and elution gradient techniques in one single continuously operating process, without the invention being able to be considered as a simple juxtaposition of the two separate steps.

Another aim of the invention is to substantially improve the traditional simulated counter-current (where there are only two effluents: one refined substance and one extract coming from the unit). Indeed, it quite often happens that the charge contains traces of a product which has been greatly adsorbed over the fixed phase. As a result, there is an accumulation which causes performances of the unit to fall, and which in the long term requires a stop so that the adsorbent can be regenerated. By virtue of the invention, it is possible to avoid these stops either by continuous regeneration or preferably by periodically using a regeneration sequence which does not stop production as such.

Generally speaking, the invention is concerned with a process for the continuous separation, into three fractions, in fluid phase, of a mixture or of a charge having at least three constituents, wherein a fluid comprising said mixture and solvent are caused to circulate at countercurrent on a sorbent contained in at least one separation column which has, at positions at equal distances apart, feed intakes for at least a part of the fluid circulating downstream of these intakes, outlets for drawing off at least a part of the fluid circulating downstream of the intakes, said column having a link or outer circulation loop for fluid between an upstream end and a downstream end, said drawing off outlets and feed intakes being displaced at countercurrent under simulated countercurrent conditions, the constituents having, relative to the sorbent and the solvent, degrees of relative adsorption which are high, moderate and low, the process being characterised by the combination of the following steps:

a) Six contiguous zones 1, 2, 3, 4, 5 and 6 are determined which have separate functions and which are mutually connected in series so that said zones and the outer bond are continuous.

b) A zone 1 for reconditioning of the sorbent from of the column is determined, said zone being defined by an amount of sorbent disposed between an intake for rinsing current at the upstream end thereof and an outlet for the recycling current at the downstream end thereof.

c) A zone 2 is given for adsorption of the least adsorbed of the constituents(s) in the column directly upstream of zone 1, said zone 2 being defined by a quantity of sorbent disposed between an outlet for a refined substance R "with weak solvent" at an upstream end of the zone and an outlet for the rinsing current at a downstream end of said zone.

d) A zone 3 is given for the adsorption of the constituent(s) which has(have) been moderately adsorbed in the column immediately upstream of zone 2, said zone 3 being defined by a quantity of sorbent disposed between an intake for said mixture at the upstream end of the outlet for the refined substance R with weak solvent at the downstream end.

e) A zone 4 is given for desorption of the constituent(s) which has(have) been adsorbed least of all directly upstream of zone 3, said zone 4 being defined by an amount of sorbant disposed between said intake for the mixture at a downstream end, and an outlet for an extract $E_1$ with a weak solvent, defined hereinbelow, at an upstream end of said zone 4.

f) A zone 5 is given for desorption of the moderately adsorbed constituent(s) directly upstream of zone 4, said zone 5 being defined by a quantity of sorbent disposed between said outlet for the extract $E_1$ with weak solvent at a downstream end and a feed intake for weak solvent at an upstream end of said zone 5.

g) A zone 6 is given for desorption of the most adsorbed constituent(s) immediately upstream of zone 5, said zone 6 being defined by a quantity of sorbent disposed between an outlet for extract $E_2$ with strong solvant, defined hereinbelow, at a downstream end of said zone 6 and a feed intake for strong solvent at an end upstream from said zone.

h) A strong solvent $S_2$ is supplied to the upstream end of zone 6, and weak solvent $S_1$ is supplied to the upstream end of zone 5, and the upstream end of zone 3 is supplied with the mixture, the chemical nature of the solvent $S_2$ differing from solvent $S_1$.

i) The mixture and a current coming from zone 4 is caused to circulate in zone 3 under conditions for adsorption permitting adsorption of the moderately adsorbed constituent(s) in said zone 3, and the refined substance R comprising the least adsorbed constituent(s) and a part of the weak solvent are drawn off.

j) The strong solvent $S_2$ and part at least of the current coming from zone 1 are caused to circulate in zone 6 under desorption conditions permitting desorption of the most adsorbed constituent(s) in zone 6, and the extract $E_2$ consisting of the most adsorbed constituents(s) and a major part of the solvent $S_2$ are drawn off from zone 6.

k) Solvent $S_1$ and the rest of the current from zone 6 are caused to circulate in zone 5 under desorption conditions permitting desorption of the moderately adsorbed constituent(s) in zone 5, and extract $E_1$ consisting of the moderately adsorbed constituents(s) and a part of the solvent $S_1$ are drawn off from zone 5.

l) A current coming from zone 5 is caused to circulate in zone 4 under desorption conditions permitting desorption of the least adsorbed and moderately adsorbed constituent(s) in zone 5.

m) The rest of the current coming from zone 3 is caused to circulate in zone 2 under adsorption conditions permitting adsorption of the least adsorbed constituent(s) in zone 2.

n) The upstream end of zone 1 is supplied with said rinsing current containing weak solvent $S_1$, and said rinsing current and a current coming from zone 2 are caused to circulate in zone 1 under conditions permitting reconditioning of the column, and the recycling current is drawing off from the zone.

o) The intake for the mixture, the outlet for the refined substance R, the intake for the rinsing current F, the outlet for the recycling current, the intake for the strong solvent $S_2$, the outlet for extract $E_2$, the intake for weak solvent $S_1$ and the outlet for extract $E_1$ are periodically advanced synchronously through the column of sorbent in the direction in which the mixture and solvents are circulating so as to displace the zones 1, 2, 3, 4, 5 and 6 in the column of sorbent, and so as to produce three fractions: the refined substance R, extract $E_1$ and extract $E_2$, each of the three fractions containing at least one constituent, the constituent(s) of each fraction being substantially recovered in total, the process furthermore being characterised in that the recycling current drawn off from the downstream end of zone 1 is caused to circulate alternatingly at the upstream end of zone 6 and then at the upstream end of zone 5, and characterised in that a part at least of the current drawn off at the downstream end of zone 6 is caused to circulate alternatingly at the upstream end of zone 5 and then in the direction of the outlet for the extract with strong solvent $S_2$.

By operating in this manner, substantially all the strong solvent is recovered from the intergrain volume of the sorbant, and zone 6 for adsorption of the most adsorbed constituent is prevented from being polluted by the weak solvent.

More precisely, the following are introduced continuously in liquid, vapour or supercritical phase:

1) two desorbent fluids $S_1$ and $S_2$ which differ in chemical properties and possibly in temperature and in utilisation pressure, and which have different affinities for the fixed contact phase defined further on (sorbent).

2) a feed mixture containing at least three constituents, at least two of which have been adsorbed in a very different way by the fixed contact phase defined further on. The three fluxes are contacted with particles of the sorbent, and they circulate through the zones defined hereinabove.

The term strong solvent $S_2$ is used to denote a solvent for which the sorbent has a greater affinity that that which it can have for a weak solvent $S_1$. Under these conditions it is possible to use solvents with different temperatures or with different pressions, or with different temperatures and pressures.

The solvent or desorbent used is selected, in particular, as a function of the kind of adsorbent, the separation operation which is to be carried out with the constituents, and as a function of the final separation operation, by distillation, for example, between the solvent and constituents.

The solvent can, for example, be selected from the organic solvents, water, carbon dioxide.

The solvent in the form of strong solvent $S_2$ is generally used at a temperature greater by 10° C., and advantageously at a temperature greater by between 20° and 50° C. than that of the same weak solvent $S_1$. The solvent $S_2$ according to the invention can also be used at a pressure which is greater by at least 1 MPa, and which is advantageously greater by between 2 and 20 MPa than that of the same weak solvent $S_1$.

It can thus be of interest to combine higher temperatures and pressures for the strong solvent, for example at least 10° C. and at least 1 MPa higher than those of the weak solvent. It is even possible to work with a strong solvent at a pressure which is greater by at least 1 MPa, and at a temperature which less by at least 10° C. than those recommended for the weak solvent, the result having to be in every case that the sorbent has a greater affinity for the strong solvent $S_2$ than for the weak solvent.

The solvent is generally miscible with the mixture. Usually only one single phase is encounterd at any time in the interparticular space of the sorbent.

It is best if the sorbent (adsorbent, absorbent or gel) is selected as a function of the separation operation of the constituents which is to be carried out in a given solvent medium. It is generally selected in the group formed by natural or synthetic zeoliths, active charcoals, silicas, silica-aluminas which are possibly grafted, clays which are possibly bridged, polymers and copolymers which are possibly functionalised such as polystyrene gel reticulated with divinylbenzene, and sulphonated for example, and ion-exchange resins and mixtures thereof.

The granulometry is usually between 1 micrometer and 1 cm, preferably between 5 micrometers and 1 mm. It is generally selected so that the greatest compromise is made between separation and admissible loss of charge. The particles of the sorbent can be of any shape, preferably spherical.

The separation temperature and pressure are usually substantially between the utilisation temperature and pressure of the strong solvent $S_2$, and the temperature has the utilisation pressure of the weak solvent $S_1$.

Each zone is composed of a plurality of sections of equal volume connected in series, each section being filled by a mass of particles of a solid adsorbent.

According to the general principle of simulated countercurrent, the time is divided into cycles defined as the time at the end of which the configuration of the unit again meets its exact identical. Each cycle is divided into as many periods as the unit comprises. Each period defines the time which elapses between the permutations in a section from one zone to the other.

In each period, the unit is homothetic with respect to itself: the number of sections in each zone remains constant, whereas the introduction points and removal points are displaced by one section. During each period, the flows within each zone remain constant.

According to the particular principle of the invention, each period is furthermore divided into two or three steps, each step being defined as a period of time in which all the flows remain constant—it being understood that the flows are usually different in two successive zones.

The adsorption and desorption conditions according to the process of the invention gradually involve feed flows and drawn off flows which are set in action by means for controlling the flows, such that the elution fronts are displaced in the various zones from the upstream end towards the downstream end of the column (direction of flow) at basically the same speed.

According to one feature of the invention, it is possible to supply the various zones and to recover the various effluents in the following way:

a) Zone 6 is supplied, in a first step, with a flow rate $d_3 = d_1 + d_2$ with $d_1$ being the flow rate of the recycling current coming from zone 1, and $d_2$ being the feed flow rate of strong solvent $S_2$. Then, in a second step, strong solvent $S_2$ is supplied at a flow rate $d_3$, substantially the same as the flow rate during the first step, and during the first step weak solvent is recovered which is sent to a storage tank, and during a second step, extract $E_2$ with strong solvent is recovered which is separated so as to obtain the most adsorbed constituent(s).

b) In a first step, zone 5 is supplied at a flow rate $d_5$ such that $d_5 < d_3$ with a part at least the weak solvent coming from the afore-mentioned tank, and in a second step zone 5 is supplied at a flow rate $d_1$ with recycling current coming from zone 1 and at a flow rate $d_4$, such that $d_4 = d_5 - d_1$, with the rest of the part of the weak solvent coming from the storage tank, and then possibly extra weak solvent is supplied, and at least a part of the extract $E_1$ is recovered at a flow rate $d_6$ such that $d_6 < d_5$, and it is separated so as to obtain the moderately adsorbed constituents(s).

d) Zone 4 is supplied with the remainder of the flux coming from zone 5 at a flow rate equal to $d_5 - d_6$, so as to obtain at the outlet a current coming from zone 4 at the same flow rate.

d) Zone 3 is supplied with said mixture at a flow rate $d_7$ and with said current coming from zone 4 at said $d_5 - d_6$, i.e. a total flow rate of $d_5 - d_6 + d_7$, and a part at least of the refined substance R with weak solvent is recovered at a flow rate $d_8$, and is separated so as to obtain the least adsorbed constituent(s), the flow rate $d_8$ being such that $d_8 + d_6 = d_4 + d_7$.

e) Zone 2 is supplied with the remainder from zone 3 at a flow rate equal to $d_5 - d_6 + d_7 - d_8$, be this $d_1$, and at the outlet a current coming from zone 2 is obtained at a flow rate $d_1$.

f) In a first step, zone 1 is supplied with said current coming from Zone 2 at a flow rate of $d_1$, and at a flow rate of $d_1$ the recycling current is recovered for the purpose of feeding zone 6 as explained in step a), and in a second step zone 1 is supplied at a flow rate of $d_1 + d_9$, $d_1$ being the flow rate of the current coming from zone 2, $d_9$ being the flow rate of the rinsing current. The recycling current is drawn off at a flow rate of $d_1 + d_9$, and is sent at a flow rate of $d_1$ to the intake of zone 5 and at a flow rate of $d_9$ towards a distillation installation for separating the weak solvent from the strong solvent.

The invention is also concerned with the apparatus which especially permits continuous implementation of the process. The apparatus consists of an apparatus for the continuous separation, into three fractions, in fluid phase of a mixture of at least three constituents, characterised in that it consists, in combination, of at least one separation column consisting of six contiguous zones, each of which consists of at least one section filled with sorbent, each section being substantially the same in volume and having an intake and outlet, the outlet from one section being connected to the intake of the following section by a link 100 adapted for the circulation of fluid in a predetermined direction by virtue of non-return means 34 connected to the link, the intake of each section consisting of supply means and a rinsing current 35, mixture supply means 38, supply means 36 for solvent S1 and supply means 37 for solvent S2, the outlet of each section consisting upstream of non-return means, means 31 for drawing off an extract E1 with weak solvent S1, means 30 for drawing off an extract E2 with strong solvent S2, means 32 for drawing off a refining substance R with weak solvent, means 33 for drawing off a recycling current, at least one of said supply means being adapted for delivering a supply, one of the drawing off means being adapted for drawing off operations: two of the means being incapable of being actuated simultaneously between two pre-determined sections.

The apparatus is also characterised in that the assembly of supply and drawing off means are arranged in such a way that:

a sixth zone 6 is delimited by an intake connected to the means for supplying the solvent S2 and by an outlet connected to the means for drawing off of the extract E2 with strong solvent;

a fifth zone 5 directly downstream of the sixth zone and connected to the means for supplying weak solvent S1, and delimited by an outlet connected to the means for drawing off the extract E1 with weak solvent;

a fourth zone 4 directly downstream of the fifth zone is delimited by an intake connected to the outlet of the fifth zone and by an outlet connected to the supply means for the mixture;

a third zone 3 directly downstream of the fourth zone is delimited by an intake connected to the outlet of the fourth zone 4 and by an outlet connected to the means for drawing off refined substance R with weak solvent;

a second zone 2 directly downstream of the third zone is delimited by an intake connected to the outlet of the third zone and by an outlet connected to the supply mean for the rinsing current;

a first zone 1 directly downstream of the second zone is delimited by an intake at the outlet of the second zone and by an outlet connected to the means for drawing off the recycling current;

the apparatus is also characterised in that it consists of:

means for successive displacement, in the direction of circulation of the fluid on the one hand, of said means for drawing off the extract E1, the extract E2, the refining substance R and the recycling current, and on the other hand of the feed means for solvent S1, for solvent S2, for rinsing current, and for mixture, these means being adapted to bring about simulated countercurent conditions.

The apparatus is also characterised in that it consists of means adapted to connect the outlet of the first zone 1 alternatingly to the inlet of the sixth zone 6 and then to the intake of the fifth zone 5, and characterised in that it consists of means adapted to connect the outlet of the sixth zone 6 alternatingly to the intake of the fifth zone 5 and then to the means for drawing off the extract E1 with strong solvent.

The total number of sections in the column is selected as a function of the complexity of the mixture. Preferably, the number of sections is between 4 and 24. The sections of the column are generally of the same cross-section and are cylindrical in shape. An external link connects each section and can consist, advantageously, of the assembly of supply means for the solvents, rinsing current admixture downstream of the afore-mentioned non-return means. The link can advantageously consist of the assembly of the afore-mentioned means for drawing off the extracts, refined substance and recycling current, upstream of the non-return means.

According to one embodiment which permits the flow rate $d_9$ of the weak solvent circulating in zone 1 to be minimised, the second step of each cycle can be divided into a plurality of phases: a) introduction of pure weak solvent into the intake of the first section of zone 1 and removal at the outlet of the last section into a plugged tank; b) introduction of the contents of the plugged tank into the intake of the second section of zone 1 and recycling at the outlet into the plugged tank; c) introduction of the contents of the plugged tank into the intake of the second section of zone 1, and removal from the outlet of the last section to a column for optional distillation.

During the second step, effluent from section 2 continues to be introduced at a flow rate $d_1$, and a part of the effluent continues to be removed from section 1 (flow rate $d_1$) towards zone 6.

According to a more elaborate variant of this embodiment of the invention, the flow $d_9$ throughout zone 1 is reheated from 10° to 100° C. so that the strong solvent may be better desorbed, the other zones being kept at a substantially constant temperature.

The invention will be better understood in the light of FIGS. 1, 2, 3, 4, 5 and 6 which give schematic illustrations of the process and the apparatus.

DESCRIPTION OF THE PREFERRED EMBODIMENTS

Figure 2:
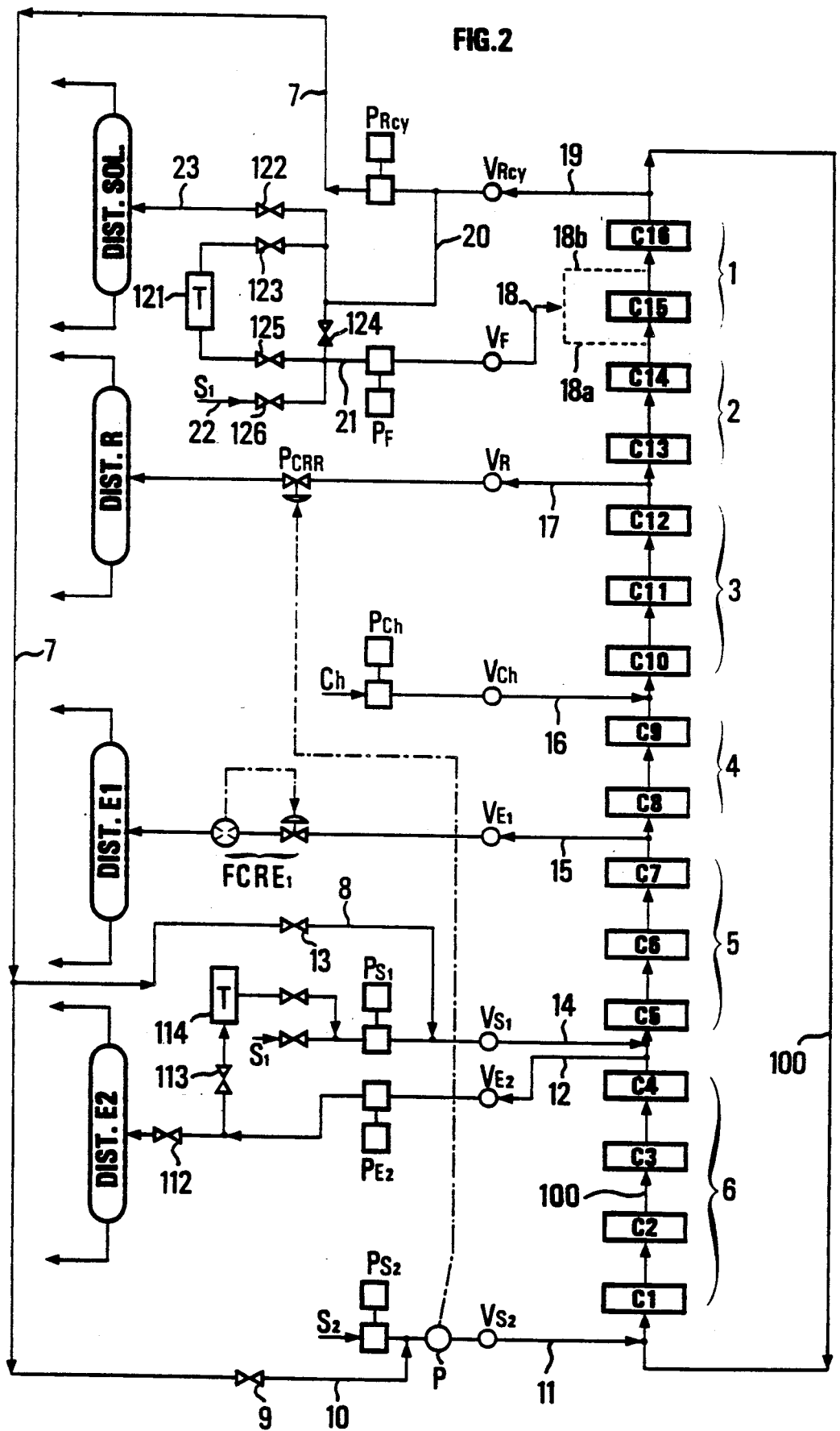
FIG. 2 shows the principle of the embodiment of the invention at a given moment; sixteen sections have been shown which are distributed in the following way (4 in zone 6, 3 in zone 5, 2 in zone 4, 3 in zone 3, 2 in zone 2, 2 in zone 1). The first period of the cycle corresponds to the introduction of the strong solvent into section 1; the number of sections and the divisions thereof is purely arbitrary.

As shown in FIG. 2, the system for separation by sorption according to the invention essentially consists of columns filled with particles of a solid adsorbent or of a semi-solid adsorbent gel, distributed over six zones; zone for desorption by strong solvent; from the most greatly adsorbed product (5) zone for desorption by the weak solvent of the moderately adsorbed solvent, (4) desorption zone by the weak solvent and the moderately adsorbed product from the product which has been adsorbed slightly or not at all, zones (4) and (5) are also zones for retention of the product adsorbed most of all, (3) zone for adsorption of the greatly and moderately adsorbed products, (2) zone for adsorption (or for removal) of the product which has been adsorbed only slightly, (or not at all), (1) zone for reconditioning the column or for desorption of the strong solvent by the weak solvent.

Flows of the various fluids are shown in FIG. 2. The strong solvent $S_2$ is pumped by a pump $PS_2$. During the first step of each period, the recycling current 10 which basically consists of strong solvent is brought to the outlet of this pump 2. The pressure of the current 11 is measured so as to regulate it. All the strong solvent 11 travels by means of the valve VS2 which permits the flow to be directed towards any of the sixteen sections C1 to C16. During the second step of the period, strong solvent is no longer pump, but the flow rate of the current 11 remains constant. During the first period of the cycle the current 11 is sent to the intake of section C1. During the second step, the flow 11 is directed towards C2, and so on and so forth up to the sixteenth and final period of the cycle where it is directed to section C16. At the outlet of section C4, a current 12 (the flow rate of which is exactly equal to that of the current 11) is removed by means of the valve VE2 which permits any one of the outlets of the sixteen sections of the column to be selected; during the first period of the cycle the outlet of C4 is selected, whereas, for example, the outlet C9 is selected during the fifth period. The pump PE2 ensures that the current 12 is removed. During the first step of the period, the current 11, constituted essentially of the weak solvent initially contained in section C4, is sent into the plugged tank 114, the valve 112 being closed, the valve 113 being open. During the second step of the period, the flow 12 is sent to the distillation device E2 where the strong solvent is separated from the more greatly adsorbed product, the valve 113 being closed and the valve 112 being open.

During a first part of the period, the pump PS1 supplies the contents of the plugged tank (114), and in a second part of the period it supplies weak solvent S1. In the first step of each period, the valve (13) is closed and nothing travels through line 8; on the other hand, during the second step of each period, the valve 9 is closed and the valve 13 is opened so that he recycling current 7 coming from zone 1 is supplied by line 8 into line 14. The flow rate in line 14 is naturally constant throughout the period. The flux passes through the valve VS1 which can supply any one of the sixteen sections. During the first step of the cycle, the flow 14 is directed towards the section C5, whereas in the second step the flow is directed towards section C6, for example.

At the outlet of zone 5, that is to say at the outlet of the section C7, during the first period, the flow is divided into 2. The valve E1 is met by line 15. This valve enables any of the sixteen outlets of the section to be selected, the line 15 then meeting the regulator for the flow FCRE1 constituted by a rotating valve which is pilot-controlled by a volumetric flow rate measuring device disposed directly adjacent thereto, the line 15 finally leading into the distillation column E1 which separates the weak solvent from the moderately adsorbed product. The second part of the flow coming from zone 5 continues on its way towards zone 4.

The intake into zone 4 corresponds to the intake into section C8 during the first period of the cycle, whereas, for example, during the ninth period of the cycle the intake would correspond to the intake of section C1. The outlet of zone 4 corresponds to the outlet of section 9 during first period of the cycle.

The whole of the flow coming from zone 4 travels towards the intake of zone 3 (section C10 in period 1). Line 16 brings to this current a flow of a charge or of a mixture by means of the pump for the charge (p ch) and by means of the valve for the charge (V ch) which is capable of directing the flow towards any of the intakes of the sixteen sections. At the outlet of zone 3 (corresponding to the end of section C12 during the 1st period of the cycle), the current is divided into two. A first part travels towards the valve VR which is capable of selecting any of the sixteen outlets of the section, and then it travels towards the control valve P.C.R.R. (which permits control of the pressure measured when the pump PS2 presses on line 11). Once the pressure is relaxed, the flow finally arrives at the distillation column Dist. R which permits the weak solvent to be separated from the product which has been adsorbed only slightly, or not at all. The line 17 connects the outlet of zone 3 to the valve VR, then to the valve P.C.R.R. then the distillation column Dist. R.

The second part of the flow coming from zone 3 continues towards the intake of zone (2) corresponding to the intake of section C13 during the first period of the cycle, and, for example, to the intake of section C15 during the third period of the cycle. The whole of the flow leaving zone 2, that is to say section C14 during the first period of the cycle is sent to zone (1).

The intake zone (1) corresponds to the start of section C15 during the first one of the sixteen periods of the cycle. During the first step of the period corresponding to the sweeping operation of the dead volume of one section, no additional flow is provided, and the whole of the flow coming from zone 1 (section C16 in period 1 of the cycle) travels via line 19 towards the valve VRcy which can connect line 19 to any of the sixteen outlets of the sections, and then connects it to the pump PRcy which sends the flow via lines 7 and 10 to line 1. During the first step, the valves 122, 123, 124, 125 and 126 are closed. During the second step of the period, operation is in accordance with the following phases:

1) By line 22, the valve 126 being open (valves 124 and 125 being closed), the pump PF is used to pump weak solvent through line 22 and then through line 21. The solvent is directed by the valve Vf towards the intake of zone (1), line 18A (section C15 during the first period of the cycle). At the outlet of zone 1 (section C16 during the first period), the whole of the flow travels through line 19 and valve VRcy. Part of the flow is sent by means of the recycling pump PRcy through the line 7, valve 13 and line 8 towards line 14. The other part of the flow flows through line 20 and valve 123 towards the plugged tank 121, valves 122 and 124 then being closed.

2) When the plugged tank 121 is filled, the valve 126 is closed and the valve 125 is opened and a mixture which is very rich in weak solvent travels via line 21 towards the pump Pf, and then towards the valve Vf which sends this mixture via line 18B to the intake of the second column of the zone (1) (section C16 in period 1). At the outlet of zone 1, the whole of the flow travels via line 19 and valve VRcy. A part of the flow is sent by the pump PRcy through line 7, valve 13 and line 8 towards the line 14. The other part of the flow flows through line 20 and the valve 123 towards the plugged tank 121, the valves 122 and 124 then being closed.

3) During the last phase of this second step, the current travelling via line 20 comes from the unit, the valves 123 and 124 then being closed and the valve 122 being open. The line 123 can be directed either towards the drain if the weak solvent is water which has been polluted by traces of strong solvent of low venal value, or towards a distillation column "Dist.Sol." in other cases. As soon as a distillation column is used, a constant flux directed towards the distillation column is removed, usually by using a pump in the plugged tank 121, so that the flow rate of entry into the latter is controlled.

Figure 6:
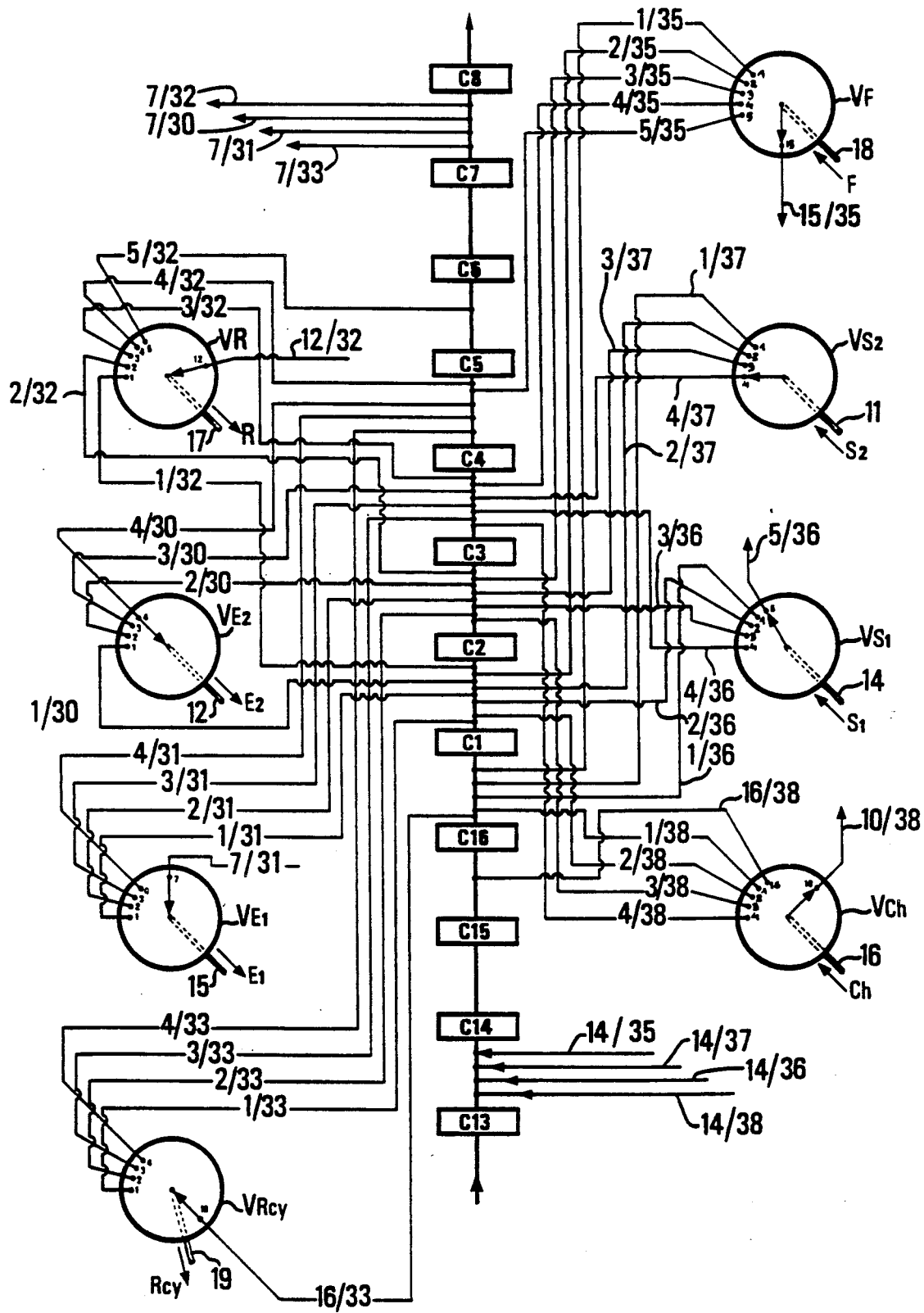
FIG. 6 illustrates the connections between the various valves and sections of the separation column.

The arrangement of the linkages between each two sections in this preferred embodiment of the invention is shown in FIG. 6. For example, the linkage between two consecutive sections Cn and Cn+1 is considered. For example, between sections C6 and C7, that which happens during the sixteen periods of the cycle is described hereinabove according to FIG. 2.

Period 1: the junction C6–C7 is in zone (5), the hole of the flow coming from C6 travels towards C7 via line 100 through the non-return flap 34, no flow in lines 30 to 33 and 35 to 38.

Period 2: the junction C6–C7 is in zone (5), the whole of the flow coming from C6 travels towards C7 via line 100 through the non-return flap 34, no flow in lines 30 to 33 and 35 to 38.

Period 3: the junction C6–C7 coincides with the junction of zones (6) and (5): the whole of the flow coming from section C6 is removed via line 30 which, in this case, coincides with line 12, zero flow inlines 31 to 33 and in the anti-return flap 34. The whole of the flow travelling in section C7 enters through line 36 which is disposed to coincide with line 14, zero flow in the lines 35, 37 and 38.

Periods 4, 5, 6: the junction C6–C7 is in zone (6), the whole of the flow travelling via the non-return flap 34, zero flow in lines 30 to 33 and 35 to 38.

Period 7: the junction C6–C7 coincides with the junction of zones (1) and (6): the whole of the flow coming from section C6 is removed via line 33 which coincides in the case with line 19, zero flow inlines 30 to 32, and in the non-return flap 34. The whole of the flow travelling in section C7 enters via line 37 which is disposed to coincide with line 11, zero flow in lines 35, 36 and 38.

Period 8: the junction C6–C7 is disposed in zone 1. During the first step, and the first part of the second stage of the period, the whole of the flow coming from C6 travels towards C7 via the non-return flap 34, lines 30 to 33 and 35 to 38 not carrying any flow. During the end of the second step of the period, the whole of the flow coming from C6 travels towards C7 through the non-return flap 34, zero flow in lines 30 to 33. A rinsing current is then provided at the intake of section C7 via line 35, this line then coinciding with line 18B, zero flow in lines 36 to 38.

Period 9: the junction C6–C7 coincides with the junction between zones (2) and (1). During the first step and the end of the second step of the period, the whole of the flow coming from the section C6 travels towards C7 through the non-return flap 34, zero flow in lines 30 to 33 and 35 to 38. During the start of the second step of the period, the whole of the flow issuing from section 6 travels through the non-return flap 34, zero flow in lines 30 to 33. A rinsing current constituted of pure weak solvent is then provided at the intake of section C7 via line 35 which then coincides with line 18A, zero flow in lines 36 to 38.

Period 10: the junction C6–C7 is disposed in zone (2): travel of all the flow through 34, zero flow in lines 30 to 33 and 35 to 38.

Period 11: the junction C6–C7 coincides with the junction between zones (3) and (2); a part of the flow coming from section C6 is removed via line 32 which then corresponds to line 17, zero flow in lines 30, 31 and 33, the second part of the flow coming from C6 travelling through 34 towards section C7, zero flow in lines 35 to 38.

Periods 12 and 13: the junction between sections C6 and C7 is in zone (3): the whole of the flux travels through 34, zero flow in lines 30 and 33, and 35 to 38.

Period 14: the junction of sections C6 and C7 corresponds to the junction of zones (4) and (3). The whole of the flux coming from the section C6 travels through 34, zero flow in lines 30 to 33. By way of the line 38 which is disposed to coincide with line 16, a current of charge is provided with flow entering section C7, zero flow in lines 35 to 37.

Period 15: the junction between sections C6 and C7 is in zone (4): the whole of the flow travels through 34, zero flow in lines 30 to 33 and 35 to 38.

Period 16: the junction between sections C6 and C7 coincides with the junction of zones (5) and (4): a part of the flow coming from section C6 is removed by line 31 which corresponds to line 15, zero flow in lines 30, 32 and 33; the second part of the flow coming from C6 travels through 34 towards section C7, zero flow in lines 35 to 38.

At the end of the sixteenth period, the cycle is looped and the last movement of valves VS2, VE2, VS1, VE1, Vch, VR, VF and VRcy bring the junction C6–C7 into its initial configuration: a new cycle then begins.

Figure 3:
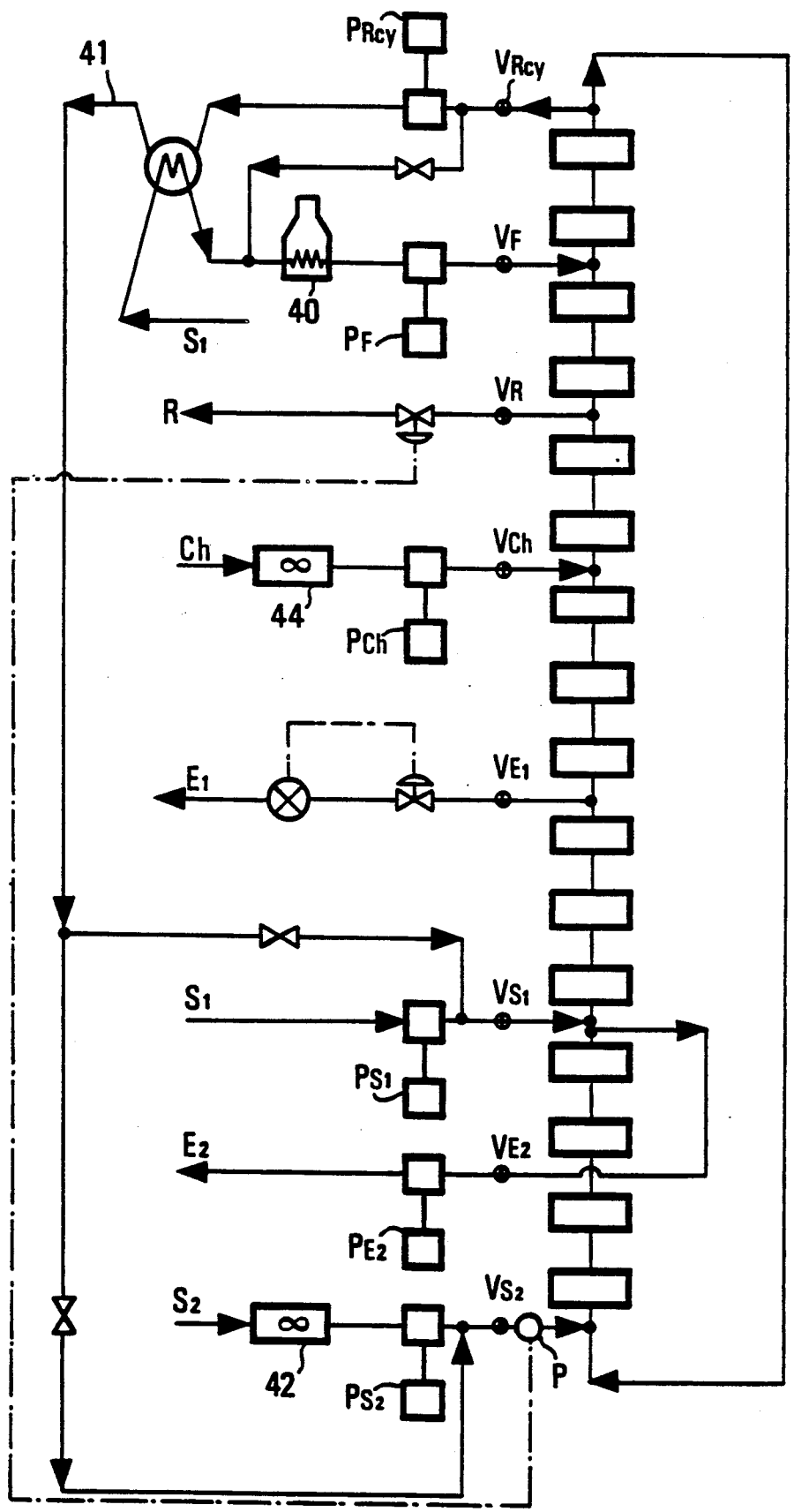
FIG. 3 shows the variant of the embodiment of the invention when the weak solvent sent into zone 1 is at a higher temperature than the rest of the unit, so that the greatly adsorbed solvent in section 1 may be better desorbed.
Figure 4:
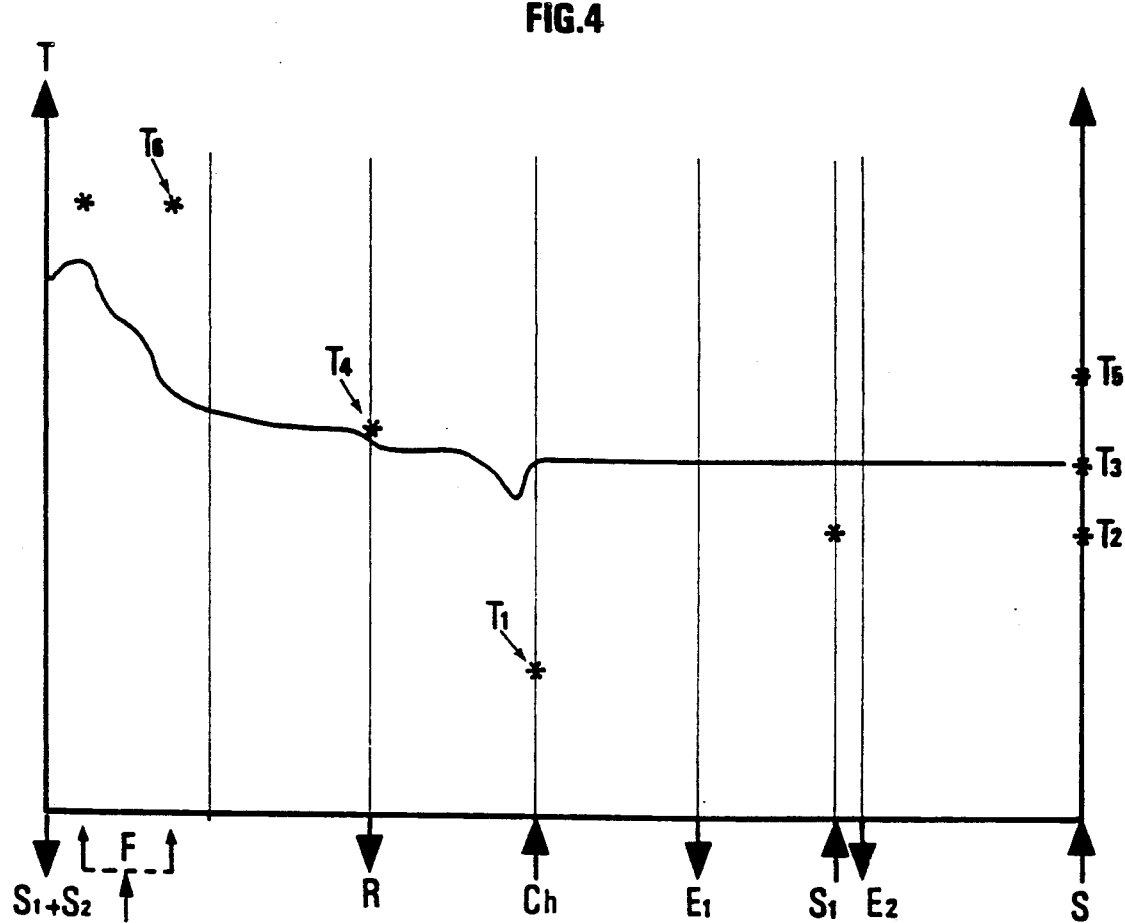
FIG. 4 shows a temperature profile in the various zones in this instance.

FIGS. 3 and 4 show a preferred embodiment for implementation of the invention.

FIG. 4 shows an example of profile of desirable temperatures in the six zone characterising the process. The means for obtaining this kind of profile (isothermal in zones (2) to (6) and a clearly higher temperature in zone (1) vary in dependency on the diameter of the columns. Typically, for columns of small diameter ($d \leq 5$ cm), it is preferable to impose an external temperature for example by way of circulating means for caloporter fluid in sections with a double casing or by winding resistors around the columns. On the other hand, in the case of columns of greater diameter, it is preferable if the temperature of the various flows is controlled.

FIG. 3 shows another, simplified version, of the drawing in FIG. 2, but the furnace 40 is also shown, as well as the exchange 41 and the coolers 42 to 44. The weak rinsing solvent entering zone (1) is reheated in the exchanger 41, on contact with the recycling current coming from zone 1, and travelling through lines 7 and then 11 towards zone 2 during the second step of each period, it attains the introduction temperature T6 in the unit by means of the furnace 40. At the end of the second step of each period, the recycled rinsing flux from the plugged tank 121 thus travels through the furnace 40 so as to reach the temperature T6. The recycled flow leaving zone (1), either towards zone (6) during the first step of each period and towards zone (5) during the second step of each period, is on average at a temperature T5 with $T5 < T6$, since the last section of zone (1) which was in zone 6 during the preceeding period has to be reheated. At the intake to zone (1) during the first step of each period, the recycling current coming from zone 1 is provided at a variable temperature greater than T3 the average temperature in zones (2) to (6). A current with strong solvent is provided at a variable temperature T2 controlled, for example by means of the cooler 42 so that the flow entering zone 1 via line 11 is at the temperature T3. During the first step of the period, the current of weak solvent entering zone (5) via line 14 is supplied at the temperature T3, and the cooler 43 is then by-passed. During the second step of each period, the recycling current coming from zone 1 is sent to zone (5) at a variable temperature greater than T3. A current of weak solvent is provided at a variable temperature T2, controlled by means of the cooler 43 so that the flow entering zone (5) via line 14 is at a temperature T3. During the second step of the period, the flow of strong solvent entering zone (6) via line 11 is at the temperature T3 and the cooled 42 is then by-passed. Moreover, when each period changes, a hot section which was in zone (1) is in zone (2); the part of the flow coming from zone (3) (temperature slightly greater than T3) is therefore reheated when it comes into contact with the hot adsorbent, with the result that the average temperature in zone (2) is T4 with T4>T3.

The average temperatures in zone (2) and in zone (3) are controlled by the temperature T1 for introduction of the charge into zone (3) (line 16). The charge thus travels via the cooler 44 in such a way that the average temperature in zone (3) is T3—because of this, T1 is lower than T3. Depending on the temperature at which the strong solvent, the weak solvent and the charge are available, and depending on the temperatures T3 and T6 involved, the coolers 42, 43 and 44 can be, not coolers, but heating means. Similarly, the furnace 40 can be an exchanger or a cooler. Generally speaking, the apparatuses 40 to 44 are temperature control means permitting a basically constant temperature in zones (2) to (6), and a higher temperature in zone (1) to be maintained.

Figure 1:
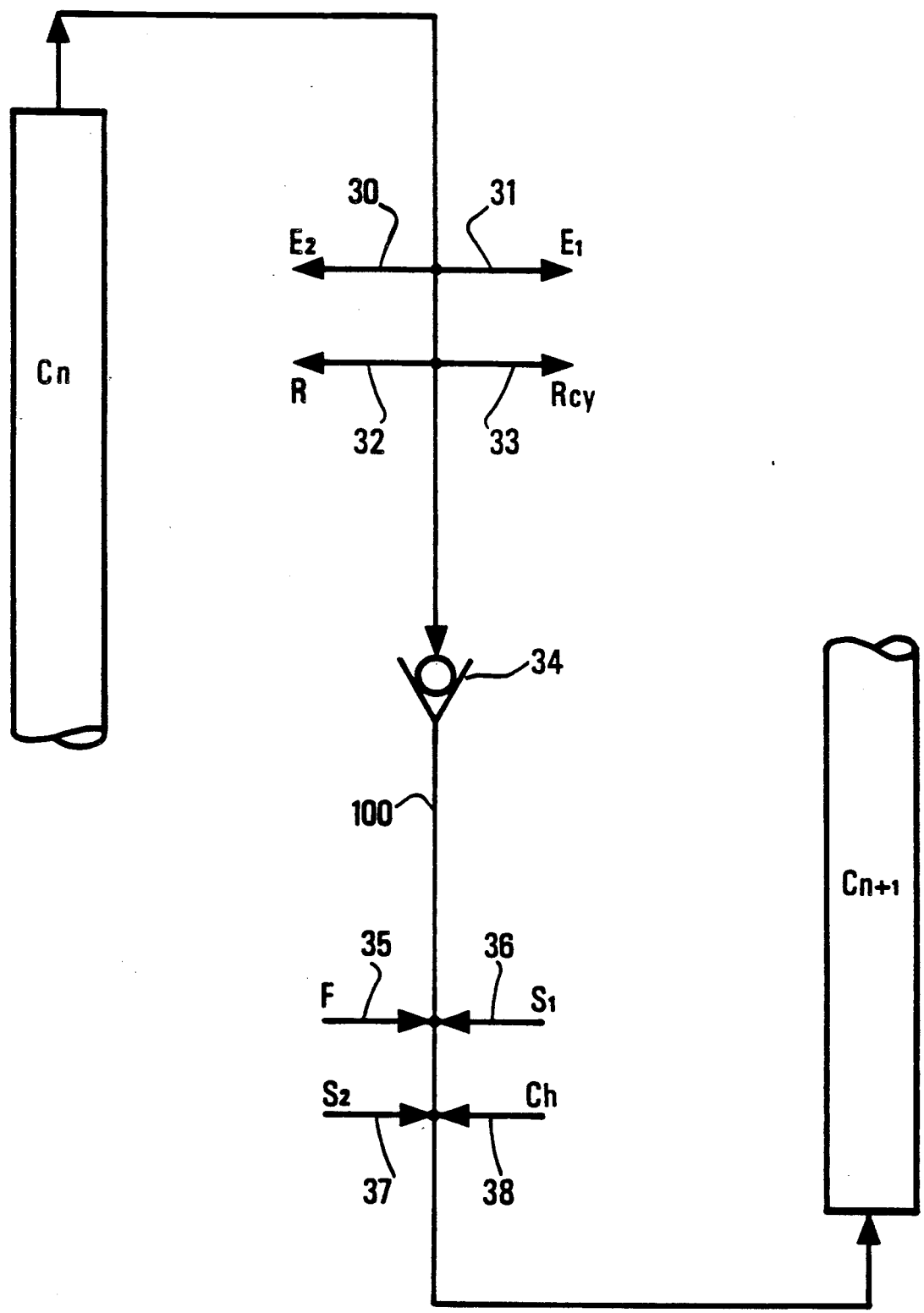
FIG. 1 shows details of the arrangement between two sections in accordance with the embodiment of the invention.
Figure 5:
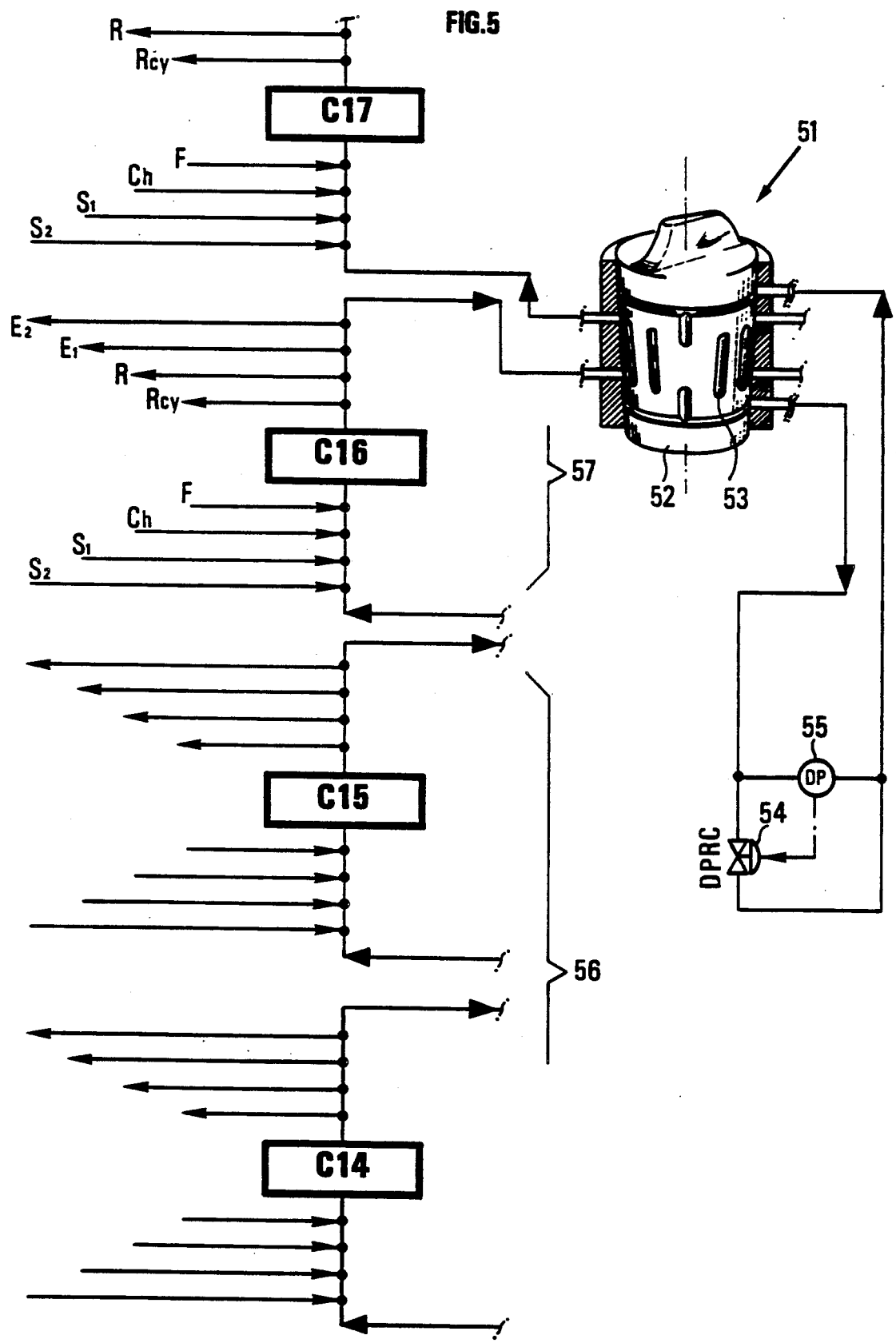
FIG. 5 shows one particular valve which permits operations at substantially different levels of pressure between two successive sections, for example when the strong solvent is a basically supercritical fluid whilst the weak solvent is constituted of the same slightly subcritical fluid.

FIG. 5 shows a valve connected to another embodiment of the invention. Here, there is a zone 6 with a much higher pressure level than in the other zones. In the case of the preferred embodiment of the invention, it is possible to reduce this difference in pressure by placing next to the eluting fluid an appropriate "holdback substance", such as methanol, for example. The valve 51, described in FIG. 5, is inserted just upstream or downstream of the non-return flap 34 (FIG. 1). Only sections 13 and 17 have been shown. In the position shown in sections 13 to 15, there is a zone of high pressure 56, whereas the columns 16 and 17 are disposed in zone of low pressure. Flow between the sections 13 and 14, 14 and 15, 16 and 17 is through a simple connection pipe, whereas between sections 15 and 16 a valve 54 for regulating pressure, a regulation means and means for capting differential pressure 55 permit control of a difference in pressure between the upstream zone 56 and downstream zone 57. When the valve rotates one position clockwise, it is at the junction of the zones 16 and 17 that the difference in pressure will be regulated. Of course, in order to create a zone like this of high pressure, it is necessary to remove a recycling current at the end of the zone by using the recycling valve, the pressure of which recycling current will be increased by the recycling pump, and/or it will be necessary to send via the valve strong solvent S1 at adequate pressure. The hollow part 52 of the valve 52 shown thus permits the conical part 52 to be slid internally in every position except one. In one particular position, the flow entering the valve is directed towards an external loop for regulating the differential pressure 54 and 55. Then, the fluid retained once again travels via the valve towards the corresponding outlet.

FIG. 6 shows a detailed drawing of the process for implementation of the invention, shown in FIGS. 1 and 2. The numbering of the line is a combination of the numbers shown in FIGS. 1 and 2. Thus, removal of the extract with strong solvent still corresponds to the suffix 30, removal of the extract with weak solvent still corresponds to the suffix 31, removal of the refined substance still corresponds to the suffix 32, removal of the recycling current still corresponds to the suffix 33, addition of the rinsing current still corresponds to the suffix 35, addition of the weak solvent still corresponds to the suffix 36, addition of strong solvent still corresponds to the suffix 37, and finally addition of the charge current still corresponds to the suffix 38. Furthermore, the prefixes indicate the number of the section which a current is going to reenter, or which it has left. For example, line 3/36 denotes the link between the valve with weak solvent VS1 and the intake into section C3, line 1/31 designates the linkage between the outlet of section C1 and the valve for weak solvent extract VE1.

Furthermore, the common intake of the valve for the charge is still labelled 16, the common intake for the valve for weak solvent is still labelled 14, the common intake of the valve for strong solvent is still labelled 11, the common intake for the weak rinsing solvent is still labelled 18, whilst the common outlets of the valves for the refined substance, for the extract of strong solvent, for the extract of weak recycling solvent are still respectively labelled 17, 12, 15 and 19.

Thus, in the expositions relating to FIGS. 1 and 2, when we say that in period 3 the junction C6-C7 corresponds to the junction zone (6), zone (5) and that because of this the lines 30 and 12 coincide, it has to be understood that the valve VE2 makes for a communication between FIGS. 6/30 and 12, and that line 12 is, during the 3rd period, extended as far as the outlet of zone 6. According to this drawing, it is easy to understand that for 16 sections and 8 rotating valves, 128 lines of this kind connect each section to each valve.

The following examples illustrate the invention in a non-limitative way:

EXAMPLE 1

A charge composed of 41% metaxylene, 22% orthoxylene, 18% ethyl benzene and 19% paraxylene is treated on a zeolith which is partially changed into potassium, and partially into barium (approximately 50%–50% expressed in normality) by a weak solvent: benzene and para methyl ethyl benzene by a strong solvent. The drawing is identical to that shown in FIG. 2. The sixteen sections have the following dimensions: diameter 5 cm, length 100 cm. The total duration of the cycle is 8 h, each perod therefore lasting 30 minutes. Table I gives the flow rates at the intake, on the inside, and at the outlet of each zone. Table 2 gives the average compositions of the intakes and outlets of each zone over a period of 24 h (three complete cycles) after a period of 10 cycles (80 h) during which the normal rate of speed is initiated.

Removal of the rinsing current to the distillation apparatus for the solvent only happens towards the end of the first period. In experiments, variations in density which were not negligible were to be observed at the outlet of the last sections of zones (6) and (1). The flow rate at the outlet of zone (6) was slightly varied so that the paraxylene content in extract 2 was maximised. In this example, the temperature remains constant at 135° Celsius.

rates as previously, except that the charge is introduced at a rate of 10.815 liters per day to take into consider-

TABLE 1

| Zone (6) | Zone (5) | Zone (4) | Zone (3) | Zone (2) | Zone (1) |
|---|---|---|---|---|---|
| ENTRIES | | | | | |
| 0 min < t < 20 min Recycling from zone (1) 2,625 l/h | 0 min < t < 20 min From plugged tank 2,58 l/h | 0 min t 30 min from zone (5) | 0 min t 30 min from zone (4) | 0 min t 30 min from zone (3) | 0 min < t < 20 min From zone (2) 2,625 l/h |
| Strong Solvent 1,025 l/h | Weak Solvent 0,97 l/h | | | | 20 min < t < 25 min from zone (2) |
| 20 min < t < 30 min Strong Solvent 3,65 l/h | 20 min < t < 30 min Recycling from zone (1) 2,49 l/h | 2,625 l/h | 2,625 l/h charge | 2,625 l/h | 2,625 l/h Weak Solvent 6,3 l/h |
| | Weak solvent 1,06 l/h | | 0,45 l/h | | 25 min < t < 30 min from zone (2) 2,625 l/h From plug to 2nd section 6,3 l/h |
| TRAVEL | | | | | |
| 0 min < t < 30 min 3,65 l/h (slightly varying with density) | 0 min < t < 30 min 3,55 l/h | 0 min < t < 30 min 2,625 l/h | 0 min < t < 30 min 3,075 l/h | 0 min < t < 30 min 2,625 l/h | 0 min < t < 20 min 2,625 l/h 20 min ≦ t < 25 min 8,925 l/h 25 min ≦ t ≦ 30 min 2,625 l/h 1st col. 8,925 l/h 2nd col. |
| ISSUES | | | | | |
| 0 min < t < 14 min 10 sec 3,64 l/h (d = 0,869) To plugged tank | 0 min < t < 30 min 2,625 l/h To zone (4) | 0 min < t < 30 min 2,625 l/h To zone (3) | 0 min < t < 30 min 2,625 l/h To zone (2) | 0 min < t < 30 min 2,625 l/h To zone (1) | 0 min < t < 20 min 2,625 l/h To zone (6) |
| 14 min 10 sec < t < 30 min 3,659 l/h (d = 0,865) To Dist. E2 | 0,925 l/h To Dist. E1 | | 0,45 l/h To Dist. Raf. | | 20 min < t < 30 min 2,49 l/h To zone (5) 6,435 l/h To plug 0 min < t < 30 min 1,095 l/h From plug to Dist. Solv. |

TABLE 2

| | Distribution of Substance over 24 h | | | | | | | |
|---|---|---|---|---|---|---|---|---|
| | Ortho xylène | Meta xylène | Ethyl benzène | Para xylène | Benzene | Para-Met-Ethyl-Benzene | Total | |
| | % p | % p | % p | % p | % p | % p | g | l |
| Entres | | | | | | | | |
| Wash (benzène) | — | — | — | — | 99,99 | — | 22142,0 | 25,2 |
| Benzene | — | — | — | — | 99,99 | — | 21087,1 | 24,01 |
| Para Met. Et. Benzene | — | — | — | — | — | 99,97 | 39279,8 | 45,6 |
| Charge | 22,31 | 40,86 | 17,98 | 18,85 | — | — | 9373,25 | 10,8 |
| Total (g) | 2091,4 | 3829,5 | 1685,4 | 1767,0 | 43229,1 | 39279,8 | 91882,1 | 105,5 |
| Issues | | | | | | | | |
| Raffinate | 22,08 | 40,38 | 0,145 | 0,055 | 36,90 | 0,44 | 9427,6 | 10,800 |
| Extract 1 (Bz) | 0,045 | 0,09 | 8,50 | 0,13 | 89,86 | 1,38 | 19460,0 | 22,18 |
| Extract 2 (PMBz) | 0,0025 | 0,013 | 0,044 | 4,35 | 2,32 | 93,27 | 39903,7 | 46,30 |
| | — | — | — | — | 92,47 | 7,53 | 23038,6 | 26,26 |
| Total (g) | 2091,37 | 3829,57 | 1685,33 | 1766,3 | 43195,1 | 39263,0 | 91829,9 | 105,5 |
| Losses (g) | −0,03 | +0,07 | −0,07 | 0,7 | −34,0 | −16,8 | 52,2 | 0,06 |

EXAMPLE 2

0.15% by weight of β picoline (3 methyl pyridine) is added to the charge in the previous example, the product being able to be separated with difficulty from the xylenes by distillation (T Eb = 144°) and moreover having been adsorbed very greatly on the zeolith used. It is established that the unit operates with the same flow ation the addition of 0.15% of β picoline. When the experiment in No. 1 is repeated (10 cycles of operations for initiation of normal speed rate and distribution of material over three cycles 11, 12 and 13), only 25 ppm β picoline is detected in extract 2. After distillation of the benzene, then of the "paraxylene", the result is an extract 2 separated from a composition of 0.57% orthoxylene, 0.29% metaxylene, 0.99% ethyl benzene, 98.64% paraxylene, 0.059% (590 ppm) β picoline: it is therefore to be noted that at this stage more than 92% of the β picoline accumulates on the fixed phase. By analysing as a function of time the purity of the various effluents, it is noted that there is a clear degradation. In addition, on the distribution of material over the whole of the cycles 51, 52, 53, it is also noted that more than 62% of the β picoline accumulates on the fixed phase. The compositions are as follows:

Refining substances: β picoline 11 ppm, orthoxylene 22.02%, metaxylene 40.22%, ethyl benzene 0.46%, paraxylene 0.11%, benzene 36.51%, para methyl ethyl benzene 0.66%.

Extract 1: orthoxylene 0.03%, metaxylene 0.06%, ethyl benzene 8.37%, paraxylene 0.31%, benzene 89.33%, para methyl ethyl benzene 1.41%, β picoline 57 ppm.

Extract 2: orthoxylene 0.001%, metaxylene 0.005%, ethyl benzene 0.02%, paraxylene 4.24%, benzene 2.50%, para methyl ethyl benzene 93.23%, β picoline 95 ppm.

Wash: orthoxylene 0.04%, metaxylene 0.08%, ethyl benzene 0.03%, paraxylene 0.01%, benzene 92.34%, para methyl benzene 7.56%, β picoline 13 ppm.

At this stage, it is possible to estimate that approximately 200 g β picoline has accumulated on the fixed phase. In order to desorb the product without stopping the unit, operation is in non-isothermal mode. In view of the small size of the pieces of equipment and because of the absence of external temperature control column per column (all columns and valves are placed in a thermostatical oven at 139° C., the differences in temperature between the various fluids entering the unit has to be amplified. Thus, the benzene for washing is heated to 185° C. to ensure a maximum temperature in the order of 170° C. in zone (1), whilst the charge is supplied at 110° C. and the para methyl ethyl benzene is supplied at 125° C. so that the temperatures in zones (2) to (6) are 3° C. away from 135° C. These conditions are maintained for 9 cycles (54 to 63) (72 h), and β picoline is dosed at intervals of 3 h into four effluents. After 51 h, no more β picoline is detected in the refined substance (detection limit 2 to 3 ppm), and after 72 h only 3 ppm β picoline is detected in extract 1. In extract 2, the β picoline content remains substantially constant between 90 and 100 ppm during 45 h, then it decreases regularly so as to reach a value in the order of 40 ppm at the end of 72 h.

Extraordinarily, the β picoline content in the washing current increases very quickly so as to reach approximately 1520 ppm after 24 h. At this stage, recycling of the washing current is stopped, and twice as much washing benzene is thus supplied. Unexpectedly, the β picoline content in the washing current only decreases slightly, 1435 ppm after 27 h, and 1410 ppm after 30 h, whereas as could be expected the content of para methyl ethyl benzene in the current is more than about 7.5% when the current is recycled to 3.85% when the recycling operation is stopped. After 57 h, the content of β picoline in the current is still 1010 ppm. That value then decreases by regular amounts to 890 ppm, 680 ppm, 460 ppm, 290 ppm and 125 ppm after 60 h, 63 h, 66 h, 69 h and 72 h. At that moment, it is thought that about 170 g β picoline have been desorbed. The initial working conditions are then resumed, and a new balance is taken of cycles 65, 66 and 67: it is noted that purity of the various effluents is almost completely restored, since the following analyses are obtained:

Refined substance: β picoline: not detectable, orthoxylene 22.10%, metaxylene 40.35%, ethyl benzene 0.16%, paraxylene 0.05%, benzene 36.88 %, para methyl ethyl benzene 0.46%.

Extract 1: β picoline 3 ppm, orthoxylene 0.04%, methaxylene 0.1%, ethyl benzene 8.48%, paraxylene 0.14%, benzene 89.85%, para methyl ethyl benzene: 1.39%.

Extract 2: β picoline 46 ppm, orthoxylene 0.002%, methaxylene 0.01%, ethyl benzene 0.045%, paraxylene 6.35%, benzene 2.34%, para methyl ethyl benzene: 93.25%.

Wash: β picoline: not detectable, orthoxylene not detectable, metaxylene 0.005%, ethyl benzene not detectable, paraxylene not detectable, benzene 92.45%, para methyl ethyl benzene: 7.54%.

During these 3 cycles it is estimated that approximately 85% of β picoline yielded has accumulated.

EXAMPLE 3

It is known that with the industrial practice to separate sugars on ion-exchange resins in calcic form (I.W.T. process and Mitsubishi Chemicals for separation of glucose-fructose and Finnsugar for Xylose Arabinose separation) a slight loss, continuously, of calcium probably caused by the presence of traces of Iron ions in the charges to be separated causes gradual inactivation of the resin, which means that the unit has to be stopped periodically so that the resin can be regenerated 1) by acid washing to pass it under the form $H^+$ and 2) by means of exchange with a concentrated solution of calcium chloride.

The intention therefore is to separate, on an ion-exchange resin (in calcic form), a mixture of 12% glucose, 78.5% of xylose and 9.5% by weight of arabinose in aqueous solution with 400 g.l.$^{-1}$ of dry substances. Operation is in accordance with a varient following the principle of FIG. 1. The rinsing solvent is constituted successively of a HCl 0.005N solution of calcium chloride 150 ppm by weight, then permuted water. The strong solvent is constituted in the following way: the recycling current from zone (1) has an average residual calcium chloride content of 40 ppm by weight, whereas the balance is made up of permuted water.

The average temperature in zone (6) is 75° C. The weak solvent is constituted of permuted water, the average temperature in zones (2) to (5) being 35° C. There are 24 columns with a double casing, and the temperature is imposed by external circulation of water. The columns which have an inside diameter of 1.6 cm and which are 1 m in length are peculiar in that they are compressed axially so as to adapt to the variations in the apparent volume of the fixed phase (which can reach 2.8%). Each period lasts 37 minutes, 30 seconds. The complete cycle of 24 periods therefore lasts 15 h.

By way of example, a short description will only be given of the first period of the cycle. During this first period, the zone (6) consists of five first columns C1 to C5 which are kept thermostatically at 75° C. During a first step of each period (duration 33 min, 09 sec), a recycling current which has come either directly from zone (1) or which is coming from a plugged tank (flow-rate 3,2250 cm$^3$/min), is sent to column 1, and also a supply of permuted water (flow rate 1.415 cm$^3$/min). During a second step of each period (from 33 min 10 sec to 37 min 30 sec), permuted water is sent at a flow rate of 4.64 cm³/min. During the whole of the duration of the period, the flow rate in zone (6) is 4.64 cm³/min. At the outlet of column 5 (from t=0 to t=7 min 12 sec), all the flux is removed to be sent to a plugged tank (this time is because the temperature at the outlet of the column 5 takes a little less than 7 minutes to pass from 35° C. to 60° C.). During the rest of the period, a flux is produced (extract 2: 4.64 cm³/min) of which the average composition is as follows: xylose 0.24 g.l.$^{-1}$. Arabinose 1.90 g.l.$^{-1}$, calcium approximately 25 ppm by weight of $CaCl_2$.

During period 1, the zone 5 is constituted of columns 6 to 10, thermostatically kept at 35° C. During a first part of the period, (from t=0 to t=8 mins 19 sec), all the liquid contained in the plugged tank is introduced at a rate of 4 cm³/min. During a second part of the period (from t=8 min 20 secs to t=33 min 10 sec), permuted water is introduced at a rate of 4 cm³/min, and finally, (from t=33 min 11 sec to t=37 min 30 sec) the recycling current coming from zone 1 is introduced at a rate of 3,225 cm³/min, and permuted water is supplied at 0.775 cm³/min. Inside zone 5, the constant flow rate is 4 cm³/min. At the outlet of the zone a current of Extract 1 is removed at the rate of 0.746 cm³/min, the composition of which is as follows: glucose 0.98 g.l.$^{-1}$, xylose 87.4 g/l$^{-1}$, arabinose 1.34 g.l$^{-1}$, approximately 6 ppm calcium in $Ca(OH)_2$ form.

During period 1, zone (4) is constituted of the columns 11 to 14, thermostatically kept at 35° C. At the intake of this zone, a current is supplied at the rate of 3.254 cm³/min, coming from zone 5. The constant current is directed to the outlet of zone (4) towards the intake of zone (3).

During period 1, zone (3) is constituted of columns 15 to 18, thermostatically kept at 35° C. At the intake of this zone, to the recycling current of flow rate 3.254 cm³/min, coming from zone 4, is added a current of charge of flow rate 0.213 cm³/min with the composition: xylose 314 g.l$^{-1}$, glucose 48 g.l$^{-1}$, arabinose 38 g.l$^{-1}$. The flow rate inside zone (3) is 3.467 cm³/min of zone (3). A flow of refined substance, flow rate 0.242 cm³/min is removed of the following composition: glucose 39.8 g.l$^{-1}$, xylose 4.08 g.l$^{-1}$, calcium 6 ppm by weight in $Ca(OH)_2$ form.

During period 1, zone 2 is constituted of columns 19 and 20, kept thermostatically at 35° C. Inside the zone there is a constant flow of 3.225 cm³/min; this current comes from zone (3) and travels to zone (1).

During period 1, zone (1) is constituted of columns 21 to 24. During an initial part of the period from t=0 to t=4 min, HCl 0.005 n is injected into the column 24 at 3.225 cm³/min. During a second part of the period, t=4 to t=12 min, injected into column 24 is a solution with 150 ppm by weight of $CaCl_2$ at the rate of 3.225 cm³/min. During a third part of the period, injected into column 21 is permuted water at a rate of 3.225 cm³/min (from t=12 min to t=24 min), finally from t=24 mins to t=37 mins 30 secs. At the outlet of zone (6) a current of flow rate 3.225 cm³/min is removed from the plugged tank located at the outlet of zone (6), which is also reinjected in column 21. The flow rate inside zone (6) is thus in total 6.45 cm³/min: 3.225 cm³/min travelling from zone (2) and at 3.225 cm³/min added into zone (6).

At the outlet of zone (1), during a first part of the period (t=0 to t=12 min), the recycling valve is used to send liquid to the plugged tank at a rate of 6.45 cm³/min. Half this flow is at 3.225 cm³/min and it is removed and sent back to zone (6). During a second part of the period (from t 12 min to t=24 min), the liquid coming from column 24 is sent to the drain, whereas the contents from the plugged tank are sent, at a rate of 3.225 cm³/min to zone (6). During a third part of the period (t=24 min to t 33 min 10 secs), 6.45 cm³/min of liquid are again to the plugged tank: half of this flow is sent to zone (6), and the other half is sent to column 21. Finally, from t=33 min 10 secs to the end of period 1, the 6.45 cm³/min coming from column 24 are directed to zone (5) and the other half recycled towards the intake of zone (1): column 21.

In order to provide the efficiency of the treatment carried out in zone 1, a comparison has been made with the same kind of operation where zone 1 does not exist (zone 2 thus consists of columns 19 to 24): the purity of the effluents is slightly less, and, in particular after 350 cycles, the unit has to be stopped for the resin to be regenerated (the rate of impurities in each effluent has tripled on average). With the step described in this example, no modification to the compositions of the various effluents is noted after 1200 operating cycles.

We claim:

1. A process for the continuous separation in fluid phase, into three fractions, of a mixture or a charge having at least three constituents, wherein a fluid comprising said mixture and solvent are caused to circulate at countercurrent on a sorbent contained in at least one separation column which has, at positions at equal distances apart, feed intakes for at least a part of the fluid circulating downstream of these intakes, outlets for drawing off at least a part of the fluid circulating downstream of the intakes, said column having a linkage or outer circulation loop for fluid between an upstream end and a downstream end, said drawing off outlets and feed intakes being displaced at countercurrent under simulated countercurrent conditions, the constituents having, relative to the sorbent and the solvent, degrees of relative adsorption which are high, moderate and low, the process being characterised by the combination of the following steps:
a) six contiguous zones 1, 2, 3, 4, 5 and 6 are determined which have separate functions and which are mutually connected in series so that said zones and the outer linkage are continuous,
b) a zone 1 for reconditioning of the sorbent of the column is determined, said zone being defined by an amount of adsorbent disposed between an intake for rinsing current at the upstream end thereof and an outlet for the recycling current at the downstream end thereof,
c) a zone 2 is given for adsorption of the least adsorbed of the constituent(s) in the column, said zone 2 being defined by a quantity of sorbent disposed between an outlet for a refined substance R "with weak solvent" at an upstream end of the zone and an intake for the rinsing current at a downstream end of said zone,
d) a zone 3 is given for the adsorption of the constituent(s) which has (have) been moderately adsorbed directly upstream of zone 2, and zone 3 being defined by a quantity of sorbent disposed between an intake for said mixture at the upstream end thereof and the outlet for the refined substance R with weak solvent at the downstream end of said zone 3, e) a zone 4 is given for desorption of the constituent(s) which has(have) been adsorbed least of all directly upstream of zone 3, said zone 4 being defined by an amount of sorbant disposed between said intake for the mixture, and an outlet for an extract $E_1$ with a weak solvent, defined hereinbelow, at an upstream end of said zone 4, f) a zone 5 is given for desorption of the moderately adsorbed constituent(s) directly upstream of zone 4, said zone 5 being defined by a quantity of sorbent disposed between said outlet for the extract $E_1$ with weak solvent and a feed intake for weak solvent at an upstream end of zone 5, g) a zone 6 is given for desorption of the most adsorbed constituent(s) immediately upstream of zone 5, said zone 6 being defined by a quantity of sorbent disposed between an outlet for extract $E_2$ with strong solvant, defined hereinbelow, at a downstream end of said zone 6 and a feed intake for strong solvent at an end upstream from said zone, h) a strong solvent $S_2$ is supplied to the upstream end of zone 6, and weak solvent $S_1$ is supplied to the upstream end of zone 5, and the upstream end of zone 3 is supplied with the mixture, the chemical nature of the solvent $S_2$ differing from solvent $S_1$, i) the mixture and a current coming from zone 4 is caused to circulate in zone 3 under conditions for adsorption permitting the adsorption of the moderately adsorbed constituent(s) in said zone 3, and the refined substance R comprising the least adsorbed constituent(s) and a part of the weak solvent are drawn off, j) the strong solvent $S_2$ and part at least of the current coming from zone 1 are caused to circulate in zone 6 under desorption conditions permitting desorption of the most adsorbed constituent(s) in zone 6, and the extract $E_2$ consisting of the most adsorbed constituent(s) and a major part of the solvent $S_2$ are drawn off from zone 6, k) solvent $S_1$ and the rest of the current from zone 6 are caused to circulate in zone 5 under desorption conditions permitting desorption of the moderately adsorbed constituent(s) in zone 5, and extract $E_1$ consisting of the moderately adsorbed constituent(s) and a part of the solvent $S_1$ are drawn off from zone 5, l) a current coming from zone 5 is caused to circulate in zone 4 under adsorption conditions permitting adsorption of the least adsorbed and moderately adsorbed constituent(s) in zone 4, m) the rest of the current coming from zone 3 is caused to circulate in zone 2 under adsorption conditions permitting adsorption of the last adsorbed constituent(s) in zone 2, n) the upstream end of zone 1 is supplied with said rinsing current containing the weak solvent $S_1$, and said rinsing current and a current coming from zone 1 are caused to circulate under conditions permitting reconditioning of the column, and the recycling current is drawn off from the zone, o) the intake for the mixture, the outlet for the refined substance R, the intake for the rinsing current F, the outlet for the recycling current, the intake for the strong solvent $S_2$, the outlet for extract $E_2$, the intake for weak solvent $S_1$ and the outlet for extract $E_1$ are periodically advanced synchronously through the column of sorbent in the direction in which the mixture and solvents are circulating so as to displace the zones 1, 2, 3, 4, 5 and 6 in the column of sorbent, and so as to produce three fractions: the refined substance R, extract $E_1$ and extract $E_2$, each of the three fractions containing at least one constituent, all of the constituent(s) of each fraction being substantially recovered;

the process furthermore being characterized in that the recycling current drawn off from the downstream end of zone 1 is caused to circulate alternatingly upstream end of zone 6 and then at the upstream end of zone 5, and characterised in that a part at least of the current drawn off at the downstream end of zone 6 is caused to circulate alternatingly at the upstream end of zone 5 and then in the direction of the outlet for the extract $E_2$ with strong solvent $S_2$.

2. A process according to claim 1, characterised in that the adsorption conditions and desorption conditions consist of supply and drawing off flows such that the elution fronts are displaced in the various zones from the upstream to the downstream end of the column at the same speed, and they are defined hereinbelow:

a) zone 6 is supplied, in a first step, with a flow rate $d_3 = d_1 + d_2$ with $d_1$ being the flow rate of the recycling current coming from zone 1, and $d_2$ being the feed flow rate of strong solvent $S_2$. Then, in a second step, strong solvent $S_2$ is supplied at a flow rate $d_3$ substantially the same as the flowrate during the first step, and during the first step weak solvent is recovered which is sent to a storage tank, and during a second step, extract $E_2$ with strong solvent is recovered which is separated so as to obtain the most adsorbed constituent(s), (b) in a first step, zone 5 is supplied at a flow rate $d_5$ such that $d_5 < d_3$ with a part at least of the weak solvent coming from the afore-mentioned tank, and in a second step zone 5 is supplied at a flow rate $d_1$ with recycling current coming from zone 1 and at a flow rate $d_4$, such that $d_4 = d_5 - d_1$, with the rest of the part of the weak solvent coming from the storage tank, and then possibly extra weak solvent is supplied, and at least a part of the extract $E_1$ is recovered at a flow rate $d_6$ such that $d_6 < d_5$, and it is separated so as to obtain the moderately adsorbed constituent(s), c) zone 4 is supplied with the remainder of the flow coming from zone 5 at a flow rate equal to $d_5-d_6$, so as to obtain at the outlet a current coming from zone 4 at the same flow rate, d) zone 3 is supplied with said mixture at a flow rate $d_7$ and with said current coming from zone 4 at said $d_5-d_6$, i.e. a total flow rate of $d_5-d_6+d_7$, and a part at least of the refined substance R with weak solvent is recovered at a flow rate $d_8$, and is separated so as to obtain the least adsorbed constituent(s), the flow rate $d_8$ being such that $d_8+d_6=d_4+d_7$.

e) zone 2 is supplied with the remainder from zone 3 at a flow rate equal to $d_5-d_6+d_7-d_8$, be this $d_1$, and at the outlet a current coming from zone 2 is obtained at a flow rate $d_1$, f) In a first step, zone 1 is supplied with said current coming from Zone 2 at a flow rate of $d_1$, and at a flow rate of $d_1$ the recycling current is recovered for the purpose of supplying zone 6 as explained in step a), and in a second step zone 1 is supplied at a flow rate of $d_1+d_9$, $d_1$ being the flow rate of the current coming from zone 2, $d_9$ being the flow rate of the rinsing current. The recycling current is drawn off at a flow rate of $d_1+d_9$, and is sent at a flow rate of $d_1$ to the intake of zone 5 and at a flow rate of $d_9$ towards a distillation installation for separating the weak solvent from the strong solvent.

3. A process according to one of claim 1, wherein zones 2 to 6 are kept at a temperature which is substantially constant and wherein the temperature in zone 1 is increased by at least 10° C. with respect to the temperature of zones 2 to 6.

4. A process according to claim 1, in which operation is at a pressure in zone 6 greater by at least 1 MPa than that in the other zones.

5. A process according to claim 1, wherein the mixture to be fractionated comprises metaxylene, orthoxylene, ethylbenzene, and paraxylene.

6. A process according to claim 5, wherein said mixture to be fractionated further comprises picoline.

7. A process according to claim 1, wherein said mixture to be fractionated comprises glucose, xylose and arabinose.

* * * * *